United States Patent [19]

Buzak

[11] Patent Number: 4,611,889
[45] Date of Patent: Sep. 16, 1986

[54] FIELD SEQUENTIAL LIQUID CRYSTAL DISPLAY WITH ENHANCED BRIGHTNESS

[75] Inventor: Thomas S. Buzak, Beaverton, Oreg.

[73] Assignee: Tektronix, Inc., Beaverton, Oreg.

[21] Appl. No.: 596,799

[22] Filed: Apr. 4, 1984

[51] Int. Cl.$^4$ .......................... G02F 1/133; H04N 5/74
[52] U.S. Cl. ..................................... 350/337; 350/345; 358/232
[58] Field of Search ............... 350/347 R, 347 E, 337, 350/388, 397, 408, 331 R, 334, 345; 353/20, 84; 358/58, 61, 64, 71, 232, 66, 56; 340/702

[56] References Cited

U.S. PATENT DOCUMENTS

| | | | |
|---|---|---|---|
| 2,586,635 | 2/1952 | Fernsler | 350/388 X |
| 2,727,441 | 12/1955 | Fulmer | 350/388 X |
| 2,753,763 | 7/1956 | Haines | 350/388 X |
| 3,781,465 | 12/1973 | Ernstoff et al. | 350/344 |
| 3,806,227 | 4/1974 | Greubel et al. | 350/347 X |
| 4,003,081 | 1/1977 | Hilsum et al. | 358/64 |
| 4,025,164 | 5/1977 | Doriguzzi et al. | 350/337 |
| 4,068,926 | 1/1978 | Nakamura et al. | 350/337 |
| 4,232,948 | 11/1980 | Shanks | 350/347 R |
| 4,295,093 | 10/1981 | Middleton | 340/702 X |

FOREIGN PATENT DOCUMENTS 2048506 12/1980 United Kingdom ................ 350/337

OTHER PUBLICATIONS

EIA Tube Engineering Advisory Counsil (TEPAC) "Optical Characteristics of Cathode Ray Tube Screens" TEPAC Pub. No. 116, p. 105, Dec. 1980.
Scheffer "Liquid Crystal Color Displays" *Nonemissive Electrooptic Displays*, Ed. Kmetz, Plenum Press 1975.

Primary Examiner—John K. Corbin
Assistant Examiner—David Lewis
Attorney, Agent, or Firm—John D. Winkelman; Paul S. Angello

[57] ABSTRACT

An enchanced luminance field sequential color image display system having an image source for providing a sequence of monochrome images. The monochromatic light images are formed of first, second and third different spectral colors. A liquid crystal switching system having crossed color selective polarizers is used to transmit the second and third colors with a first direction of polarization and to transmit the first and third colors with an orthogonal direction of polarization. A liquid crystal retarder is used to rotate the direction of polarization of light incident from the crossed polarizers by ninety degrees when the retarder is in its OFF state and to transmit the light substantially unchanged when the retarder is in its ON state. The light is then coupled to an analyzing system which in one embodiment is a neutral polarizer that transmits either the second and third colors or the first and third colors, depending on the state of the liquid crystal retarder. In a second embodiment, the analyzing system is one or more color selective (pleochroic) polarizers that transmits both polarizations of the third color, while transmitting only one polarization of the first color or one polarization of the second color depending on the state of the retarder. By transmitting two of the three spectral colors in each of both directions of polarization through the retarder, a significant increase in display luminance is obtained.

18 Claims, 6 Drawing Figures

FIELD SEQUENTIAL LIQUID CRYSTAL DISPLAY WITH ENHANCED BRIGHTNESS

TECHNICAL FIELD

This invention relates to multiple color display systems, and particularly to field sequential color display systems that employ liquid crystal optical switches for color selection.

BACKGROUND OF THE INVENTION

Field sequential color display systems have a long history, including a significant role in the early development of color television. For a variety of reasons, such systems never achieved substantial commercial success. Perhaps the main drawback was the lack of a fast, low cost color selection device. Indeed, early field sequential TV systems employed a mechanical color wheel for this task, imposing a practical limitation on the size of the picture tube that could be used. Larger sized displays were produced using projection techniques, but at a cost of significantly reduced image brightness.

The development of fast liquid crystal optical switches in recent years has focussed new attention on field sequential color display systems. Such systems are described, for example, in U.S. Pat. Nos. 3,781,465 to Ernstoff et al., 4,003,081 to Hilsum, and 4,295,093 to Middleton, and in "Liquid-crystal shutter changes monochrome TV images into color", *Electronics*, Mar. 24, 1981, pp. 81, 82. More recently, the development of a very fast-switching liquid crystal device known as a "pi-cell" has made it practical to provide less expensive high-resolution color displays for electronic instruments, such as oscilloscopes and logic analyzers. The pi-cell optical switch and an accompanying field sequential display are described in Bos et al., "A Liquid Crystal Optical Switching Device ($\pi$-Cell)", 1983 S.I.D. Digest, pp. 30, 31; Vatne et al., "A High Resolution LC/CRT Color Display", 1983 S.I.D. Digest, pp. 28, 29; and Bos et al., "Design Considerations For The $\pi$-Cell, A Fast Electro-Optical Switch", Proc. of the Third Int. Display Research Conf. (1983) pp. 478–481.

FIG. 1 illustrates the principles of operation of a limited color liquid crystal field sequential display. A cathode-ray tube (CRT) is employed which has a phosphor screen that emits light at a plurality of wavelengths, corresponding to two different spectral colors, and which operates in conjunction with the fast liquid crystal color switch. Although the two colors chosen most often are red and green, others can be used as well. In this example, yellow and cyan have been chosen.

When an image is displayed on the CRT screen, the yellow light and cyan light components of the image are plane polarized in directions orthogonal to each other by a color selective filter formed by a pair of pleochroic polarizers. The polarized light then traverses a liquid crystal device called a pi-cell which acts as a switchable half-wave retarder. The optic axis of the pi-cell is disposed at a 45 degree angle with respect to the absorption axes of both of the color selective linear polarizers. When the pi-cell is in its ON state, the light passes through the cell unaltered and strikes the final linear polarizer which is oriented to transmit only the polarization state of the cyan light. When the pi-cell is in its OFF state, it acts as a half-wave retarder of the color of light to which it is tuned. Hence, the polarization of light incident on the pi-cell is rotated by 90°, and only the yellow light is of the proper polarization to pass through the final linear polarizer.

By switching between the two polarization states while synchronously writing information on the CRT, a multi-color display is produced, the particular colors being determined by the relative intensity of the light produced by the CRT during each state of polarization. The range of obtainable colors for such a yellow-cyan system is illustrated on the chromaticity diagram shown in FIG. 2 and corresponds to the line joining the yellow and cyan points on the diagram.

In such field sequential liquid crystal systems, display brightness is a primary concern and considerable effort is devoted to matching the CRT phosphor emission peaks with the polarizers' transmissivities. Even so, inherent light losses created by polarization of the emitted light and the duty cycle of the liquid crystal cell reduces the theoretical maximum efficiency for transmitted white light to only 25%. In an actual physical implementation of such a system, the efficiency is generally in the range of 10–14%. The reduced brightness of such displays is largely compensated for by the inherent high contrast produced in high ambient light levels. Nevertheless, some applications require the use of a more expensive, high output CRT in order to obtain a sufficiently bright display.

SUMMARY OF INVENTION

In accordance with certain preferred embodiments of the invention, a field sequential color display system is provided that includes a source of sequential color images, each composed of light in three—i.e., first, second and third—different colors. A liquid crystal switching system having crossed, color selective polarizers is used to transmit the second and third colors with a first direction of polarization and to transmit the first and third colors with an orthogonal direction of polarization. The switching system includes a liquid crystal retarder which rotates the polarization direction of light from the crossed polarizers by substantially 90 degrees when the retarder is in its OFF state, and transmits the light substantially unchanged when the retarder is in its ON state. The light is then coupled to an analyzing system which in one embodiment transmits either the second and third colors in one polarization direction or the first and third colors in the other polarization direction, depending on the state of the liquid crystal switch. In a second embodiment, the analyzing system always transmits the third color in both polarization directions while, depending on the state of the retarder, it transmits either the first color or the second color in only one polarization direction.

By transmitting two of the three spectral colors in each of both directions of polarization through the retarder, a significant increase in the luminance can be obtained. For example, in a system of green, red, and blue, transmitting the colors green and red (i.e., yellow) along one axis of polarization and green and blue (i.e., cyan) along the second axis of polarization produces a theoretical maximum transmission efficiency of 40% in one embodiment, and up to 50% in a second embodiment. This is a substantial increase over the 25% theoretical maximum efficiency of the FIG. 1 system.

The primary difference between the two preferred embodiments is in the analyzing system. In the first embodiment, the analyzing system is a neutral linear polarizer, which transmits light in only one direction of polarization during each color field of the transmitted image. Hence, in a system designed for a green boost, i.e. one in which green is present in both directions of polarization, such as described above, the analyzer transmits the green light in only one direction of polarization during each field. However, in the second embodiment, the analyser system includes color selective linear polarizers which during each field pass both directions of polarization of the green light to provide an even larger boost.

DETAILED DESCRIPTION OF PREFERRED EMBODIMENTS

Figure 3:
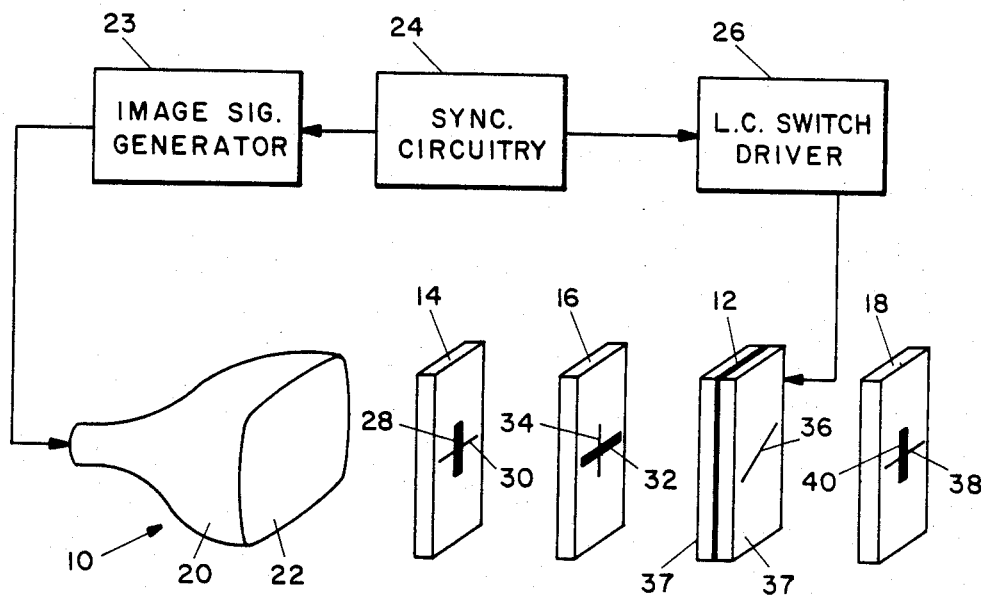
FIG. 3 illustrates a field sequential color display system in accordance with a first preferred embodiment of the invention.

In accordance with one preferred embodiment of the invention, shown in FIG. 3 is a field sequential display system which can achieve a significant increase in brightness over the prior art yellow-cyan system described in the Background of the Invention. The system of the invention includes an image source 20, suitably a cathode-ray tube, which emits multicolored light from a phosphor screen 22. Components of the light then pass sequentially through other elements making up a liquid crystal optical switching assembly, i.e., crossed, color selective linear polarizers 14 and 16, an electrically switchable liquid crystal retarder 12, and a neutral linear output polarizer 18. The image source in the preferred embodiment comprises a CRT device which produces a sequence of images by, for example, the well-known television-type raster scan technique. The CRT is coupled to an image information signal generator 23 that, in response to signals from a synchronization circuit 24, causes the CRT to produce a sequence of black and white images field-by-field in alternating first and second time intervals. Synchronizing circuit 24 also is coupled to a driver circuit 26, which provides the signals needed for switching retarder 12 on and off in synchronization with the alternating image fields. As will be understood, color selective polarizers 14 and 16 separate the color components of light from CRT screen 22 into mutually perpendicular (i.e., horizontal and vertical) orientations. The state of retarder 12 determines which orientation is transmitted to a viewer by output polarizer 18. Thus, images produced by CRT 20 during the time interval corresponding to the retarder's ON state will appear in one color (e.g., cyan), and those produced during its OFF state interval will appear in the other color (e.g., yellow). The field switching rate is made sufficiently high for visual persistence to integrate successive fields so that the different colors appear to be displayed simultaneously. By writing the same information during both fields, and suitably controlling image intensity, any desired color within the spectral range between yellow and cyan can be produced.

Figure 1:
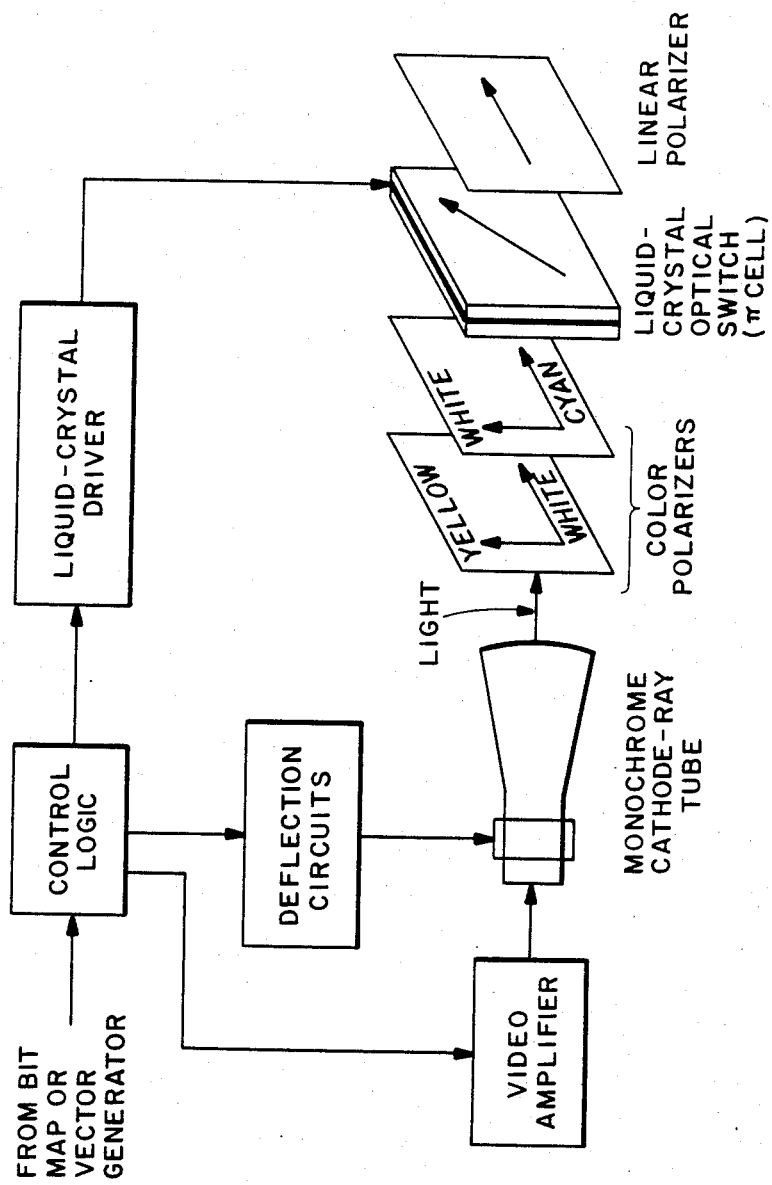
FIG. 1 shows a prior art liquid crystal field sequential color display.
Figure 4:
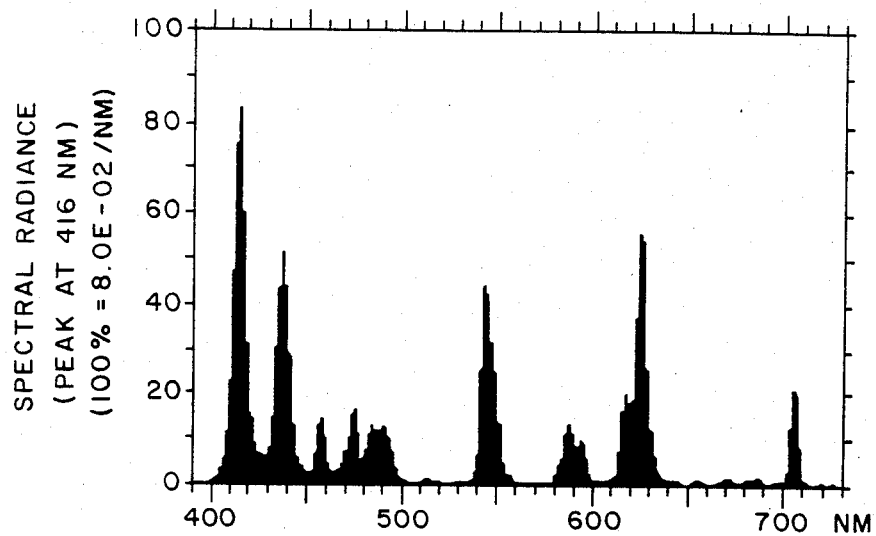
FIG. 4 is a plot of the emission spectrum of a three component color phosphor for use in a display screen according to the invention.
Figure 5:
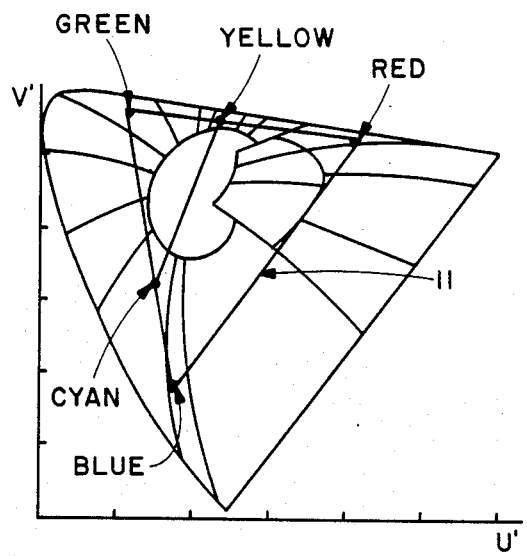
FIG. 5 is a chromaticity diagram showing the potential range of colors which can be achieved with the phosphor system of FIG. 4, and with the two color-selective polarizers according to the invention.

Unlike the prior art system of FIG. 1, CRT screen 22 is not made up of a two-component phosphor, but suitably uses a three-component phosphor instead. For maximum color range the phosphor mixture is chosen to have an emission spectrum with three primary regions of emissivity corresponding to the vicinity of three primary colors such as red, green and blue. Such phosphors are well known in the art and FIG. 4 provides a graph of the emission spectrum of a P-45 type three-component phosphor used in the preferred embodiment of the invention. FIG. 5 provides a chromaticity diagram of this phosphor system illustrating the range of colors which can be achieved using these three primaries, i.e. those colors lying within triangle 11. The system of the invention, however, has a more restricted range of colors corresponding to the values of chromaticity lying along the line between the points labeled yellow and cyan.

Color selective linear polarizers 14 and 16 are conventional devices typically constructed of stretched PVA having an admixture of dichroic dyes to achieve the desired color selectivity. In this particular embodiment the dyes and the molecular orientations are chosen to provide a red-green selective polarizer 14 which transmits red and green light polarized along its vertically disposed absorption axis 28, and which transmits white light (i.e., all colors) polarized along its horizontally disposed transmission axis 30. Similarly, blue-green selective polarizer 16 transmits blue and green light polarized along its horizontally disposed absorption axis 32 and white light polarized along its vertically disposed transmission axis 34. The range of colors which can be produced by these polarizers is shown in FIG. 5. It should be noted that since the cyan light consists of green light and blue light from the phosphor screen 22, the chromaticity value corresponding to the cyan light must lie along the line of triangle 11 joining the chromaticity values representing the emissions from the blue and green phosphors. Similarly, the chromaticity value corresponding to the yellow light lies along the line of the triangle joining the red and green phosphor emission values.

Electrically switchable optical retarder 12 preferably is a nematic liquid crystal device of the type referred to in the Background section as a pi-cell. The construction and operation of such a cell is described in detail in the Bos et al. publications referenced above.

As described briefly in the Summary of the Invention, optic axis 36 of retarder 12 is oriented at an angle of 45° relative to both the absorption axis 28 of polarizer 14 and the absorption axis 32 of polarizer 16. When the retarder is in its ON state, it transmits light from polarizers 14 and 16 substantially unchanged in color and polarization. Since the absorption axis 40 of neutral polarizer 18 is in that event parallel to the polarization direction of the yellow light, it is absorbed. However, the cyan light which has a polarization direction parallel to the neutral polarizer's transmission axis 38, is transmitted by polarizer 18.

When the retarder is in the OFF state, it rotates the polarization of incident light substantially 90°. It will be apparent to those skilled in the art, however, that retarder 12 will provide 90 degrees of rotation only for a single frequency of light, whereas for other frequencies the birefringence of the liquid crystal will result in some elliptical polarization of the transmitted light.

In the display system of the embodiment, it is desired that retarder 12 provide precisely 90° rotation of linearly polarized cyan light—i.e., the color to be absorbed by polarizer 18 during the retarder's OFF state. This insures maximum absorption of the cyan light by linear polarizer 18, preventing contamination of the yellow light transmitted during the retarder's ON state. In practice, retarder 12 is tuned to rotate by 90° light having a frequency intermediate that of the green and blue light from phosphor 22. Thus the two cyan-forming components are rotated individually with a small amount of ellipticity. However, because neutral polarizer 18 absorbs substantially all of the blue and green having components of polarization parallel to absorption axis 40, only a small admixture of blue and green (i.e., those components of polarization parallel to transmission axis 38) will be transmitted through linear polarizer 18 along with those components of the yellow light (i.e. red and green) which are parallel to transmission axis 38.

Although there is some reduction in the intensity of the yellow light transmitted through polarizer 18 due to the fact that it is not precisely linearly polarized by retarder 12, this reduction due to ellipticity is not significant.

To appreciate the significance of the invention, it is instructive to look at the relative white efficiency of a yellow-cyan display implemented with a 2-color phosphor mixture compared to one using a 3-color mixture. In the 2-color case, the theoretical maximum efficiency of the yellow and cyan polarizers is 50%, since each polarization state transmits one-half of the incident light. Also, because the system is field sequential, the resulting 50% duty cycle imposes another 50% reduction in the transmitted light. Hence, the maximum theoretical white efficiency using a 2-color phosphor mixture is 25%, i.e., 0.5×0.5.

For comparison purposes, the theoretical maximum efficiency of the FIG. 3 system using a 3-color (red, green, blue) phosphor mixture with the spectrum shown in FIG. 4 can be calculated as follows. The maximum theoretical white efficiency of display system 10 necessarily represents the sum of the theoretical efficiencies corresponding to the two retardation states of retarder 12. The reason is that in the preferred embodiment, only two of the three colors red, green, and blue exit display system 10 in each state. In particular, red and green light exit display system 10 in the one state, and blue and green light exit display system 10 in the other state. One must consider, therefore, the light outputs for both states to compute the maximum theoretical white efficiency for the 3-color phosphor mixture. The relative contributions to the luminance of the white light images are approximately 60% from green light, 30% from red, and 10% from blue. The yellow contribution for white light images corresponds to a mixture of red and green in approximately the same proportions. The green contribution to the yellow light is reduced by 50% in traversing polarizer 18, and is reduced another 50% because the system is field sequential. Hence the total green contribution to the yellow light transmitted through the color switch is 15% (i.e. 60×0.5×0.5). Similarly, the red component is 7.5% (i.e. 30×0.5×0.5), so that the total theoretical luminance contribution of the yellow light is 22.5% (i.e., 15%+7.5%). Similarly for the cyan light, the green again contributes 15%, and the blue contributes 2.5% (i.e., 10×0.5×0.5). Hence, the theoretical luminance contribution of the cyan light is 17.5% (i.e., 15%+2.5%) and the total luminance of the system is 40% (i.e., 22.5%+17.5%) that of the light emitted by phosphor mixture 22, i.e., a 40% efficiency. This is a significant boost in luminance over the 25% efficiency of the prior art 2-component phosphor system. It should also be noted that a luminance boost can also be obtained by using either the blue twice or the red twice instead of the green, but in each of those cases the boost would not be as large due to the reduced luminance contributions of red and blue colored light.

Figure 6:
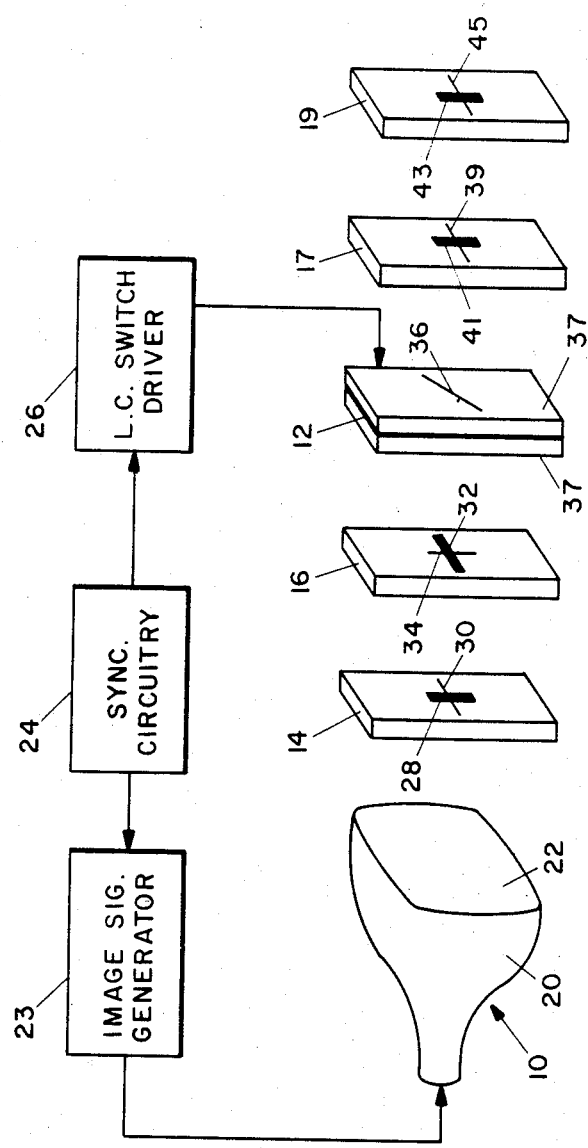
FIG. 6 illustrates a second embodiment in accordance with the invention.

According to a further aspect of the invention, the luminance of the color display system is increased even further by not polarizing the green light, so that green light of both directions of polarization is output during each field. In such an embodiment, shown in FIG. 6, two color selective linear polarizers 17 and 19 are substituted for neutral linear polarizer 18 of the FIG. 3 embodiment. Polarizer 17 selectively transmits yellow light polarized in a direction parallel to absorption axis 41 (i.e., it absorbs blue and transmits red and green), and transmits white light polarized in an orthogonal direction, i.e., the direction parallel to transmission axis 39. Similarly, polarizer 19 selectively transmits cyan light polarized parallel to absorption axis 43, (i.e., it absorbs red and transmits green and blue), and transmits white light polarized parallel to its transmission axis 45, which is orthogonal to absorption axis 43. In addition, transmission axes 39 and 45 are disposed parallel to absorption axis 32 of color selective linear polarizer 16.

When retarder 12 is in its ON (non-rotating) state, red, green and blue light from phosphor screen 22 is transmitted through crossed polarizers 14 and 16 and retarder 12, and impinges on polarizers 17 and 19. The cyan light components (i.e., blue and green light) having a polarization direction parallel to the transmission axes (39 and 45) of polarizers 17 and 19 are transmitted by the polarizers. The orthogonally polarized green component of the yellow light also is transmitted through both polarizers, since neither absorbs green light polarized parallel to its absorption axes. However, the red component of the yellow light, which is polarized in the direction of the absorption axis 41 and 43, is absorbed by polarizer 19. It should be noted that in this embodiment retarder 12 preferably is "tuned" for blue light (i.e., configured to provide precisely 90° rotation of blue light) rather than for cyan light as in the FIG. 3 embodiment.

In the OFF state, both the yellow and cyan components are rotated through substantially 90° by retarder 12 so that primarily yellow passes through transmission axes 39 and 45. The blue component of the cyan light which is polarized in a direction substantially orthogonal to the yellow is absorbed in polarizer 17 and the green component of the cyan passes through both polarizers 17 and 19 suffering only minimal attenuation.

Figure 2:
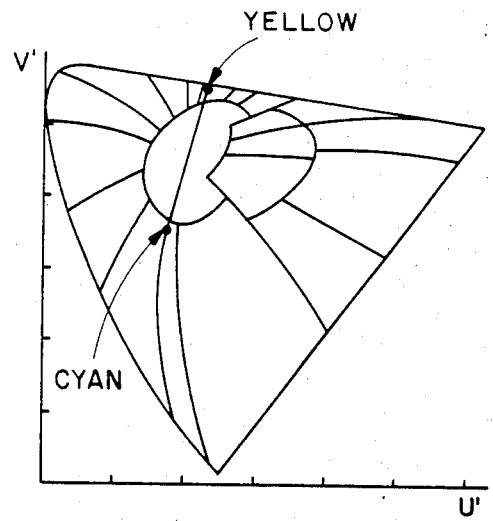
FIG. 2 is a chromaticity diagram for a two-color phosphor screen of the field sequential display shown in FIG. 1.

The overall result of this second embodiment is to further enhance the green content of the transmitted image in each frame, therefore making it appear substantially brighter. From a practical point of view, however, images produced by this second embodiment have twice as much green as needed. To preserve the desired chromaticity, which is determined by the ratio of the relative luminance values of the various components, requires that ratio of red to green be 1:2, and that the ratio of blue to green be 1:6, as in the light from the phosphor screen. This can be accomplished by reducing the proportion of green phosphor in screen 22, while at the same time increasing the red and blue phosphor content in their appropriate photometric proportions to obtain an overall increase in luminance while maintaining the desired chromaticity. Theoretical estimates of the white efficiency of such a system show a 25% increase over that of the first embodiment, i.e. an overall theoretical maximum efficiency of 50%. It should be understood that in practice, however, the actual percentage increase will be somewhat less than 25% since the use of two color selective polarizers 17 and 19 instead of the single neutral polarizer 18 is likely to introduce additional attenuation. Those skilled in the art will appreciate, that a single green selective polarizer (i.e., a polarizer which transmits green on one axis, which absorbs red and blue on that same axis, and which transmits all three colors on the orthogonal axis) can be used to replace polarizers 17 and 19, eliminating the additional attenuation that results from using two polarizers (17 and 19) instead of one as in the FIG. 2 embodiment. However, it is not uncommon for a combination of two polarizers to attenuate light less than a single polarizer, depending on the particular dichroic dyes used in producing them.

While there has been shown and described certain preferred embodiments of the present invention, it will be apparent to those skilled in the art that many changes and modifications may be made without departing from the invention in its broader respects. For example, the invention is not limited to a yellow-cyan switch, and other liquid crystal cells, such as twisted nematic cells, can be used. Therefore, the appended claims are intended to cover all such modifications and changes that fall within the true spirit and scope of the invention.

I claim:

1. A display system, comprising:
   source means for providing a sequence of images carried by light of plural wavelengths, the plural wavelengths including a nonzero component of a first primary color, a nonzero component of a second primary color, and a nonzero component of a third primary color;
   polarizer means for resolving said light from said source means into a first direction of polarization and a second direction of polarization orthogonal to said first direction by substantially totally absorbing said component of said light of said first primary color which is polarized in said first direction of polarization and transmitting said components of said second and third primary colors which are polarized in said first direction of polarization, and by substantially totally absorbing said component of said light of said second primary color which is polarized in second direction of polarization and transmitting said components of said first and third primary colors which are polarized in said second direction of polarization;
   switch means exhibiting a first state in response to a first control signal for absorbing said first primary color of said light while substantially simultaneously transmitting a light output of said second and third primary colors of said light, and switch means exhibiting a second state in response to a second control signal for absorbing said second primary color from said light while substantially simultaneously transmitting a light output of said first and third primary colors of said light; and
   control means coupled to said source means and to said switch means for providing said first and second control signals in synchronism with said sequence of images.

2. A display as in claim 1 wherein said switch means further comprises:
   retardation means in response to said first control signal for transmitting substantially unchanged in polarization and color light incident from said polarization means, and in response to said second control signal for transmitting with color substantially unchanged light incident from said polarization means and for rotating said first and second directions of polarization by substantially 90 degrees.

3. A display as in claim 2 wherein said switch means further comprises:
   neutral linear polarizer means for absorbing light incident from said retardation means which is polarized in a direction parallel to said first direction of polarization.

4. A display as in claim 3 wherein said third primary color corresponds substantially to the color green.

5. In a display system, an apparatus comprising:
   source means for providing a sequence of images carried by light of plural wavelengths, the plural wavelengths including a nonzero component of a first primary color, a nonzero component of a second primary color, and a nonzero component of a third primary color;
   polarizer means for resolving said light from said source means into a first direction of polarization and a second direction of polarization orthogonal to said first direction by substantially totally absorbing said component of said light of said first primary color which is polarized in said first direction of polarization and transmitting said components of said second and third primary colors which are polarized in said first direction of polarization, and by substantially totally absorbing said component of said light of said second primary color which is polarized in said second direction of polarization and transmitting said components of said first and third primary colors which are polarized in said second direction of polarization;
   retardation means in response to a first control signal for transmitting substantially unchanged in polarization and color light incident from said polarizer means, and in response to a second control signal for transmitting substantially unchanged in color light incident from said polarization means and for rotating said first and second directions of polarization by substantially 90 degrees; and
   analyzer means for receiving light transmitted from said retardation means and transmitting an output of light polarized in a direction parallel to said second direction of polarization.

6. An apparatus as in claim 5 in which said analyzer means transmits light having a direction of polarization parallel to said second direction of polarization and absorbs light having a direction of polarization parallel to said first direction of polarization.

7. An apparatus as in claim 6 wherein said analyzer means comprises a neutral linear polarizer having its absorption axis parallel to said first direction of polarization.

8. An apparatus as in claim 7 wherein said third primary color corresponds substantially to the color green.

9. An apparatus as in claim 5 in which said analyzer means transmits all colors of said light polarized in a direction parallel to said second direction of polarization and transmits only said component of said third primary color of said light polarized in a direction parallel to said first direction of polarization.

10. An apparatus as in claim 9 wherein said analyzer means further comprises:
first and second color selective polarizers arranged such that light transmitted through said first color selective polarizer impinges on said second color selective polarizer, with each of said first and second color selective polarizers having a transmission axis for transmitting all colors of light polarized in a direction parallel to said second direction of polarization, with said first color selective polarizer having an absorption axis parallel to said first direction of polarization for substantially totally abosrbing said component of light of said first primary color polarized in said first direction of polarization and for transmitting said components of light of said second and third primary colors polarized in said first direction of polarization, and with said second color selective polarizer having an absorption axis parallel to said first direction of polarization for substantially totally absorbing said component of light of said second primary color polarized in said first direction of polarization and for transmitting said components of light of said first and third primary colors polarized in said first direction of polarization.

11. An apparatus as in claim 10, wherein said third primary color corresponds substantially to the color green.

12. A method of producing a bright display comprising the steps of:
(a) producing a field-by-field sequence of images carried by light of plural wavelengths, the plural wavelengths including a nonzero component of a first primary color, a nonzero component of a second primary color, and a nonzero component of a third primary color;
(b) providing an alternating sequence of first and second control signals in synchronism with said sequence of images, with each control signal corresponding to a field of said sequence of images;
(c) selectively absorbing from said light in response to said first control signal, said component of said first primary color and substantially simultaneously transmitting a light output of said components of said second and third primary colors; and
(d) selectively absorbing in response to said second control signal said component of said second primary color and substantially simultaneously transmitting a light output of said components of said first and third primary colors.

13. A method as in claim 12 wherein step (c) includes:
(e) substantially totally absorbing said components of said second and third primary colors which are polarized in a first direction and transmitting said components of second and third primary colors which are polarized in a second direction orthogonal to said first direction.

14. A method as in claim 13 wherein step (d) includes:
(f) substantially totally absorbing said components of said first and third primary colors which are polarized in said second direction and transmitting said components of said first and third primary colors which are polarized in said first direction.

15. A method as in claim 14 wherein step (f) includes:
(g) rotating the direction of polarization of said components of said first and third primary colors transmitted in step (f) by substantially 90 degrees.

16. A method as in claim 15 wherein said third primary color corresponds substantially to the color green.

17. A field sequential color display system, comprising:
light source means for emitting a sequence of images carried by light of plural wavelengths that include first, second, and third nonzero primary color components;
color selection means optically coupled to said source means for alternately transmitting different selected pairs of said primary color components in synchronization with the sequential emission of said light images by said light source means, said color selection means including a light polarizing system that includes a color selective filter having first and second substantially orthogonally oriented absorption axes, said filter passing a first selected pair of said primary color components linearly polarized along said first absorption axis and a second selected pair of said primary color components linearly polarized along said second absorption axis; and
a light analyzing system that includes a polarizing filter passing light of said first, second, and third primary color components linearly polarized along an axis parallel to one of said first and second absorption axes of the color selective filter.

18. The display system of claim 17, wherein said color selection means further comprises polarization switching means disposed between said polarizing system and said analyzing system, said switching means having a first transmission state in which linearly polarized light from said polarizing system is transmitted to said analyzing system with its polarization direction substantially unchanged and a second transmission state in which the polarization direction of said light is rotated about 90 degrees.

* * * * *